US012612187B2

(12) United States Patent
Chirol et al.

(10) Patent No.:  US 12,612,187 B2
(45) Date of Patent:      Apr. 28, 2026

(54) METHOD FOR REPAIRING A STRUCTURAL PART OF AN AIRCRAFT HAVING A PROTECTION DEFECT, AND STRUCTURAL AIRCRAFT PART THUS REPAIRED

(71) Applicant: Airbus Operations SAS, Toulouse (FR)

(72) Inventors: Clement Chirol, Toulouse (FR); Marine Chesneau, Toulouse (FR); Mélanie Bedu, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 14 days.

(21) Appl. No.: 18/794,716

(22) Filed: Aug. 5, 2024

(65) Prior Publication Data

US 2025/0074626 A1      Mar. 6, 2025

(30) Foreign Application Priority Data

Aug. 31, 2023    (FR) ...................................... 2309139

(51) Int. Cl.
B64F 5/40          (2017.01)
B05D 5/00          (2006.01)

(52) U.S. Cl.
CPC ............... B64F 5/40 (2017.01); B05D 5/005 (2013.01)

(58) Field of Classification Search
CPC ... B64F 5/40; B05D 5/005; B23P 6/04; B29C 73/10; B64D 45/02
See application file for complete search history.

(56) References Cited

U.S. PATENT DOCUMENTS

| | | | | | |
|---|---|---|---|---|---|
| 3,528,165 | A | * | 9/1970 | Abbott ................. | F16B 33/008 |
| | | | | | 244/119 |
| 3,983,304 | A | * | 9/1976 | Sekhon ................ | F16B 33/008 |
| | | | | | 427/388.5 |
| 4,599,255 | A | * | 7/1986 | Anglin ...................... | B32B 3/12 |
| | | | | | 428/116 |
| 4,629,631 | A | * | 12/1986 | Dearnaley ............... | C23C 14/48 |
| | | | | | 427/523 |
| 4,755,904 | A | * | 7/1988 | Brick ...................... | F16B 19/05 |
| | | | | | 244/1 A |

(Continued)

FOREIGN PATENT DOCUMENTS

| | | | | | |
|---|---|---|---|---|---|
| CA | 2215117 C | * | 7/2003 | ............. | B32B 3/266 |
| CN | 104451812 A | * | 3/2015 | | |

(Continued)

OTHER PUBLICATIONS

French Search Report for corresponding French Patent Application No. 2309139 dated Feb. 26, 2024.

*Primary Examiner* — William P Fletcher, III
(74) *Attorney, Agent, or Firm* — Greer Burns & Crain Ltd.

(57) ABSTRACT

A method for repairing a zone of a metal structural aircraft part having a protection defect in the vicinity of an orifice for receiving a fastener. There is a step of positioning an isolation element on the zone around the orifice, a step of applying a coat of paint to the zone, covering the isolation element, and a step of inserting a metal fastener into an orifice of the isolation element, prior to or following the step of applying the coat of paint. The metal of the fastener is in contact with the isolation element, itself in contact with the metal forming the aircraft structure.

11 Claims, 9 Drawing Sheets

(56) References Cited

U.S. PATENT DOCUMENTS

| | | | | | |
|---|---|---|---|---|---|
| 4,891,732 | A * | 1/1990 | Jones | F16B 37/044 | |
| | | | | | 174/2 |
| 5,845,872 | A * | 12/1998 | Pridham | B64D 45/02 | |
| | | | | | 244/1 A |
| 7,307,825 | B2 * | 12/2007 | De La Fuente De Ana | | |
| | | | | B29C 70/885 | |
| | | | | | 361/218 |
| 7,554,785 | B2 * | 6/2009 | Hawley | B64D 45/02 | |
| | | | | | 361/112 |
| 7,599,164 | B2 * | 10/2009 | Heeter | B64D 45/02 | |
| | | | | | 361/117 |
| 7,686,905 | B2 * | 3/2010 | Ackerman | B64D 45/02 | |
| | | | | | 264/258 |
| 8,312,606 | B2 * | 11/2012 | Reid | B21J 15/147 | |
| | | | | | 411/361 |
| 9,481,012 | B2 * | 11/2016 | Anderson | B64F 5/10 | |
| 9,481,157 | B2 * | 11/2016 | Ackerman | B32B 37/18 | |
| 10,053,761 | B2 * | 8/2018 | Poupon | B64F 5/10 | |
| 10,428,860 | B2 * | 10/2019 | Dobbin | F16B 43/001 | |
| 11,293,474 | B2 * | 4/2022 | Sisco | F16B 33/06 | |
| 11,560,910 | B2 * | 1/2023 | Bourges | B05D 3/0493 | |

| | | | | | |
|---|---|---|---|---|---|
| 2007/0041143 | A1 * | 2/2007 | Georgeson | B64D 45/02 | |
| | | | | | 361/220 |
| 2009/0178262 | A1 * | 7/2009 | Reid | B21J 15/105 | |
| | | | | | 411/60.2 |
| 2010/0219287 | A1 * | 9/2010 | Sánchez-Brunete Álvarez | | |
| | | | | B64D 45/02 | |
| | | | | | 244/1 A |
| 2010/0277849 | A1 * | 11/2010 | Morrill | B64D 45/02 | |
| | | | | | 361/220 |
| 2016/0273572 | A1 * | 9/2016 | Dobbin | B64D 45/02 | |
| 2017/0350840 | A1 * | 12/2017 | Ding | G01N 17/02 | |
| 2018/0066693 | A1 * | 3/2018 | Busby | B64U 20/00 | |

FOREIGN PATENT DOCUMENTS

| | | | | | |
|---|---|---|---|---|---|
| CN | 108970914 | A * | 12/2018 | | B64F 5/40 |
| CN | 106435601 | B * | 5/2019 | | C23F 15/00 |
| EP | 0248122 | B1 * | 7/1992 | | B64D 45/02 |
| EP | 0835049 | A2 * | 4/1998 | | B32B 3/266 |
| EP | 0685389 | B1 * | 8/1999 | | B64D 45/02 |
| EP | 0976652 | A1 * | 2/2000 | | B64D 45/02 |
| EP | 2261057 | A1 * | 12/2010 | | B44F 1/04 |
| WO | WO-2014148963 | A1 * | 9/2014 | | B64D 45/02 |
| WO | WO-2022090833 | A1 * | 5/2022 | | C09J 7/30 |

* cited by examiner

METHOD FOR REPAIRING A STRUCTURAL PART OF AN AIRCRAFT HAVING A PROTECTION DEFECT, AND STRUCTURAL AIRCRAFT PART THUS REPAIRED

CROSS-REFERENCES TO RELATED APPLICATIONS

This application claims the benefit of French Patent Application Number 2309139 filed on Aug. 31, 2023, the entire disclosures of which are incorporated herein by way of reference.

FIELD OF THE INVENTION

The present application relates to a method for repairing a protection defect, for example a paint defect, present in a zone of a structural part of an aircraft, the zone of the structural part having an orifice for receiving fastening means in the vicinity of the protection defect. The present application also relates to a structural aircraft part that has undergone such a repair method.

BACKGROUND OF THE INVENTION

As is known, the elements of the structure of an aircraft forming an interface with the fuel tank of the aircraft, such as for example the wing, or the central wing box of the aircraft, made from metal, for example aluminium alloy, are subjected to surface treatment and are then covered with at least one coat of paint (anodizing, primer paint and top coat paint), in order to provide it with active protection against corrosion, as well as an isolation function against the risk of sparking in the boundary zone with the fuel tank.

The different parts of the structure of an aircraft are assembled with each other using fastening elements, so as to form the structure of the aircraft.

During the manufacturing of a metal or aluminium alloy structural part of the aircraft, or more generally during the assembly of the different parts forming the structure of the aircraft, damage, such as scratches or impacts, can occur to the paint of the structural part, in particular caused by drilling tools, or during the operations to mount/remove the fastenings (temporary or permanent). This damage must be repaired so that the entire structure is protected, in particular against corrosion.

In order to repair this damage to the paint, the damaged surface of the structural part of the aircraft is first sanded so as to smooth the surface of the structural part and ensure a crack-free surface, and then a surface treatment can be applied to the sanded surface in order to allow improved adhesion of the paint. A first coat of primer paint (containing corrosion inhibitors) is applied to the treated surface in order to provide the structural part with corrosion-resistant properties and finally, optionally, a second coat of top coat paint is applied to the surface of the structural part, in the zone that was damaged. This protection system ensures protection against corrosion and the isolation function vis-à-vis the fastening elements required in the event of sparking during a lightning strike. Once these steps have been performed, the protection defect is no longer visible and the repair is complete.

A drying time must however be observed between the surface treatment and the coat of primer paint, and then between the coat of primer paint and the coat of top coat paint. In order to then be able to install fastenings on the structure of the aircraft, a drying time must also be observed after the application of the last coat of paint. These drying times are necessary for the polymerization of the resin contained in the paint applied to the structure. These drying times are however relatively long (more than 24 hours). If these drying times are not observed, the corrosion-resistant and lightning-resistant properties of the structure of the aircraft cannot be guaranteed.

When damage to the paint of a structural part appears in the vicinity of a fastening element, if the fastening element is installed on paint for which the drying time was not observed, there is a risk of crazing or crawling of the paint, which leads to the risk that the metal material of the fastening element will be in contact with the metal material forming the substrate of the structural part. This results in an increased risk of galvanic corrosion between the fastening element and the substrate of the structural part, and the electromagnetic hazard (EMH) requirements are not met. The isolating barrier between the structural part of the aircraft and the fastening element, normally produced by the different coats of paint, is not guaranteed.

In addition, repairs to damage on the paint of the structure are generally carried out in confined areas with restricted access, which makes the implementation of accelerated drying means complicated or even impossible. Drying at ambient temperature takes dozens of hours, which has a significant impact on production cycles. The present invention aims to overcome these drawbacks.

SUMMARY OF THE INVENTION

The present invention aims to propose a solution that makes it possible to restore the isolating barrier between the metal material forming the means for fastening two structural aircraft parts to each other and the metal material forming the structural aircraft parts, by introducing isolation means.

To this end, the invention relates to a method for repairing a zone of a metal structural part of an aircraft having a protection defect, the zone of the structural part having a first orifice for receiving metal fastening means, the first orifice having a first diameter. The repair method comprises:

a step of sanding during which the paint in the zone of the structural aircraft part is sanded.

According to the invention, the repair method also comprises:

a step of positioning isolation means during which isolation means are positioned on the sanded zone of the structural aircraft part around the first orifice, the isolation means comprising a second orifice having a second diameter substantially equal to the first diameter of the first orifice, the isolation means being positioned on the sanded zone of the structural aircraft part around the first orifice so that the first and second orifices are coaxial, a step of applying at least one coat of paint during which a coat of primer paint is applied to the sanded zone of the structural aircraft part, the coat of primer paint being applied to the isolation means.

Advantageously, the introduction of isolation means makes it possible to avoid direct contact between the fastening means (made from a metal material) intended to be inserted into the first orifice, and the structural aircraft part (also made from a metal material such as aluminium alloy).

According to one feature, the repair method comprises, prior to the step of positioning the isolation means, a step of inserting fastening means during which fastening means are inserted into the second orifice of the isolation means, and during the step of positioning the isolation means, the fastening means are inserted into the first orifice, and during the step of applying the coat of paint, the coat of paint is applied to the fastening means.

Advantageously, the fastening means are installed so that they are in direct contact with the isolation means, and are no longer in contact with the zone of the structural aircraft part, which makes it possible to avoid contact between the metal material of the fastening means and the metal material forming the aircraft structure.

According to another feature, the fastening means take the form of a shank having first and second ends, and a head at the first end, the fastening means being inserted into the first and second orifices by the second end of the shank, the outer diameter of the isolation means being greater than the diameter of the head of the fastening means.

According to this feature, during the step of inserting fastening means, the head of the fastening means bears against the isolation means.

According to another feature, the repair method comprises, prior to the step of applying the coat of paint, a step of inserting fastening means during which fastening means are inserted into the second orifice of the isolation means and into the first orifice, and during the step of applying the coat of paint, the coat of paint is applied to the fastening means.

According to one feature, the repair method comprises, prior to the step of applying the coat of paint, a step of positioning masking means during which masking means are positioned in the first and second orifices, and after the step of applying the coat of paint, a step of removing the masking means during which the masking means are removed from the first and second orifices, and a step of inserting fastening means during which fastening means are inserted into the first and second orifices.

According to one feature, during the step of inserting fastening means, the head of the fastening means bears against the coat of paint.

Advantageously, the introduction of the isolation means makes it possible to eliminate the paint drying time before the installation of the fastening means. The isolation means make it possible to avoid direct contact between the metal material of the fastening means and the metal material forming the aircraft structure, even in the event of crazing or crawling of the paint applied between the head of the fastening means and the isolation means.

According to another feature, the repair method comprises, after the sanding step, a surface treatment step during which a chemical conversion coating or a reactive primer is applied to at least part of the sanded zone of the structural aircraft part.

The invention also relates to a structural aircraft assembly comprising a first metal structural part and a second structural part, the first structural part having at least a first orifice for receiving fastening means, the first orifice having a first diameter, the first and second structural parts being fastened to each other by metal fastening means inserted into the first orifice.

According to the invention, the aircraft structure also comprises isolation means having a second orifice having a second diameter substantially equal to the first diameter of the first orifice, the isolation means being positioned on the first structural part around the first orifice so that the first and second orifices are coaxial, the fastening means being inserted into the second orifice and into the first orifice.

The invention thus relates to a metal structural aircraft part having a zone repaired by means of the repair method according to the invention.

According to one feature, the fastening means take the form of a shank having first and second ends, and a head at the first end, the fastening means being inserted into the first and second orifices by the second end of the shank, the outer diameter of the isolation means being greater than the diameter of the head of the fastening means, the first structural part being covered with a coat of primer paint. According to this feature, the head of the fastening means bears against the isolation means, and the isolation means and the fastening means are covered with the coat of paint.

According to another feature, the head of the fastening means bears against the coat of paint.

Advantageously, the fastening means are installed after the coat of paint has been applied, and are therefore either in direct contact with a coat of paint of the structural aircraft part, or in contact with the isolation means (if it has not been possible to observe the drying time of the coat of paint and the coat of paint has been pushed by the pressure out of the contact zone between the fastening means and the structural aircraft part during the placement of the fastening means). In any event, the fastening means are not in direct contact with the zone of the structural aircraft part, which makes it possible to avoid contact between the metal material of the fastening means and the metal material forming the aircraft structure.

According to another feature, the isolation means take the form of a pressure-sensitive adhesive with which a supporting material is coated.

Advantageously, the isolation means can thus adhere to the sanded zone of the structural aircraft part and can be compressed by the fastening means on the placement thereof. This makes it possible to guarantee that the isolation means form an isolating barrier between the fastening means and the zone of the structural aircraft part.

According to another feature, the isolation means are made from vinyl, polyurethane or epoxy.

According to another feature, the isolation means comprise a corrosion inhibitor.

According to another feature, the isolation means have a thickness of between 30 and 200 microns.

BRIEF DESCRIPTION OF THE DRAWINGS

Further features and advantages will become apparent on reading the following description of the invention, given by way of example only, with reference to the appended drawings, in which.

DETAILED DESCRIPTION OF THE PREFERRED EMBODIMENTS

Figure 17:
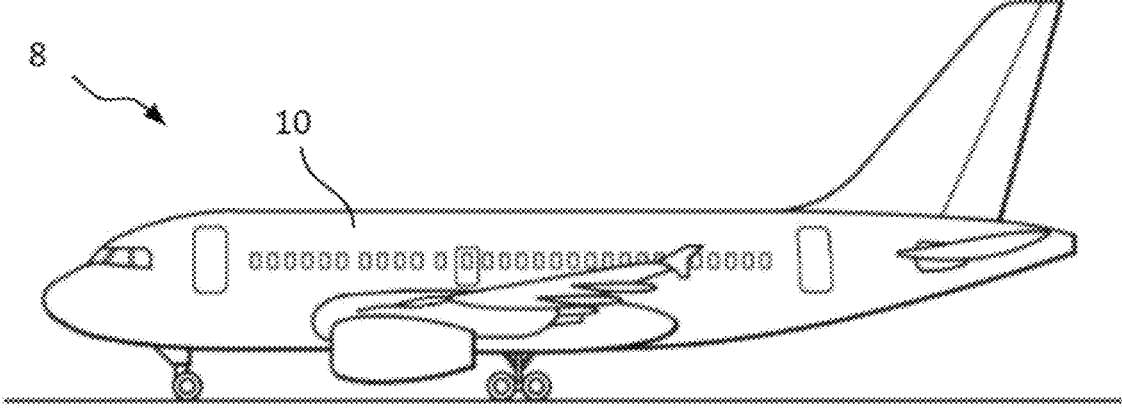
FIG. 17 is a side view of an aircraft.

As shown in FIG. 17, an aircraft 8 comprises a structure 10. This structure 10 comprises a plurality of structural parts 12, 14, which are painted and then assembled with each other using fastening means. The structural parts 12, 14 can be, but are not limited to, elements of the structure of the aircraft that form an interface with the fuel tank of the aircraft, such as for example the wing, or the central wing box of the aircraft. During the assembly of these structural aircraft parts 12, 14, defects, such as scratches or impacts, can occur on the paint of one of the structural parts 12. This damage to the paint of the structural parts can lead to defects in the protection of the structural part.

Figure 1:
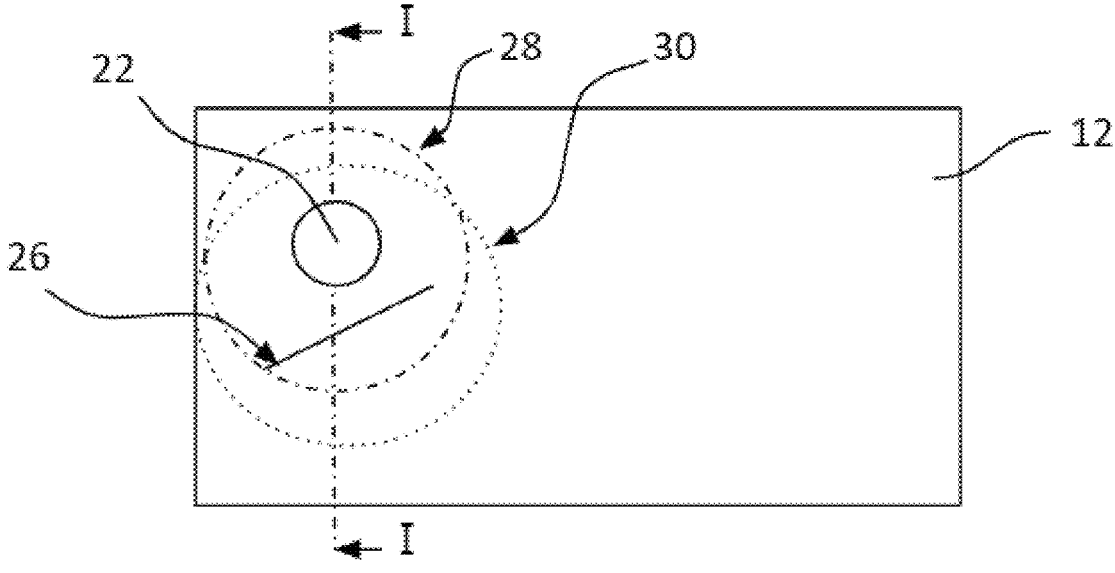
FIG. 1 is a top view of a zone of a structural part of an aircraft having a protection defect.
Figure 2:
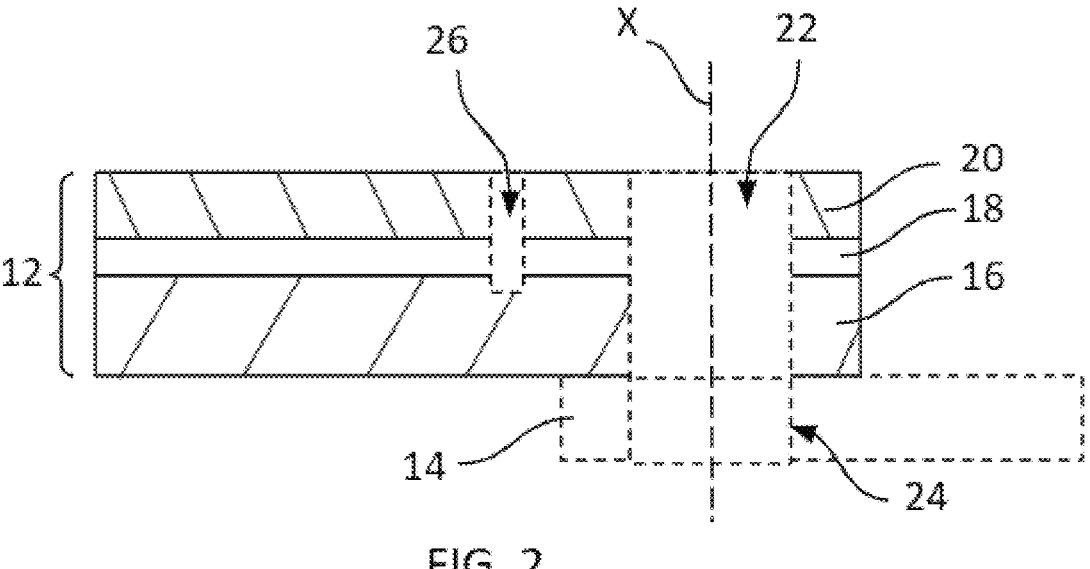
FIG. 2 is a cross-sectional view of FIG. 1, along the line I-I.

FIGS. 1 and 2 show structural aircraft parts 12, 14 intended to be assembled with each other. The structural aircraft part 12 comprises a metal body 16, for example aluminium alloy, which is covered with a coat of aluminium oxide 18 after it has undergone an anodizing treatment (a specific surface treatment of aluminium that consists of creating a very strong, uniform coat of aluminium oxide using electrolysis). For example, the thickness of the coat of aluminium oxide 18 is between 1 and 5 microns. This structural aircraft part 12 is also covered with at least one coat of paint 20. For example, the structural aircraft part 12 can be covered with a single coat of paint 20, as shown in FIG. 2, or a first coat of paint, referred to as primer paint, and a second coat of paint, referred to as top coat paint. The application of one or more coats of paint to a structural part of an aircraft depends on the location of the structural part on the aircraft. As a function of the location of the structural part on the aircraft, the structural part is subjected to various conditions that can lead to the appearance of corrosion, and therefore requires a greater or lesser degree of corrosion protection. A second coat of top coat paint is applied to certain structural parts only, as a function of their location on the aircraft. In any event, the structural part is covered with at least one coat of protective paint. The single coat of paint 20 or the first coat of paint generally contains corrosion inhibitors. The thickness of the coat of paint 20 is, for example, approximately 25 microns. The structural aircraft part 12 also comprises an orifice 22 for receiving fastening means. This orifice 22 extends along the axis denoted X in FIG. 2. A coat of aluminium oxide 18 or paint 20 extends in a plane orthogonal to the axis X, as shown in FIG. 2. The orifice 22 passes through the structural aircraft part 12, i.e., the orifice 22 emerges on either side of the structural aircraft part 12. Likewise, the structural aircraft part 14 comprises an orifice 24 that is coaxial with the orifice 22 of the structural aircraft part 12, so that the fastening means can be inserted into the orifices 22, 24 in order to fasten the structural aircraft parts 12, 14 to each other.

The structural aircraft part 12 has a defect 26, which passes through the coat of paint 20 and the coat of aluminium oxide 18, and can penetrate into the thickness of the body 16. In the location of this defect 26, the body 16 is no longer protected by the aluminium oxide, or by the paint, and as a result the body 16 does not have optimum corrosion-resistant and lightning-resistant properties in the location of the defect 26. Of course, not all defects 26 necessarily reach the body 16. Some defects 26 can penetrate only part of the coat of paint 20, or pass through the coat of paint 20 and penetrate only part of the coat of aluminium oxide 18. Damage that penetrates at least part of the coat of paint 20 is considered to be a defect.

This defect 26 is situated in the vicinity of the orifice 22 for receiving the fastening means. "In the vicinity of" is given to mean that for a diameter D of the fastening means, the defect 26 is situated in a zone centred on the orifice 22 for receiving the fastening means having a diameter less than or equal to five times the diameter D of the fastening means. The zone 28 shown in FIG. 1 shows a zone considered to be in the vicinity of fastening means. This zone 28 contains the defect 26. As a result, the zone 30 shown in FIG. 1, centred on the defect 26 and including the orifice 22 for receiving the fastening means, is considered to be a damaged zone of the structural aircraft part 12 that must be repaired.

Figure 3:
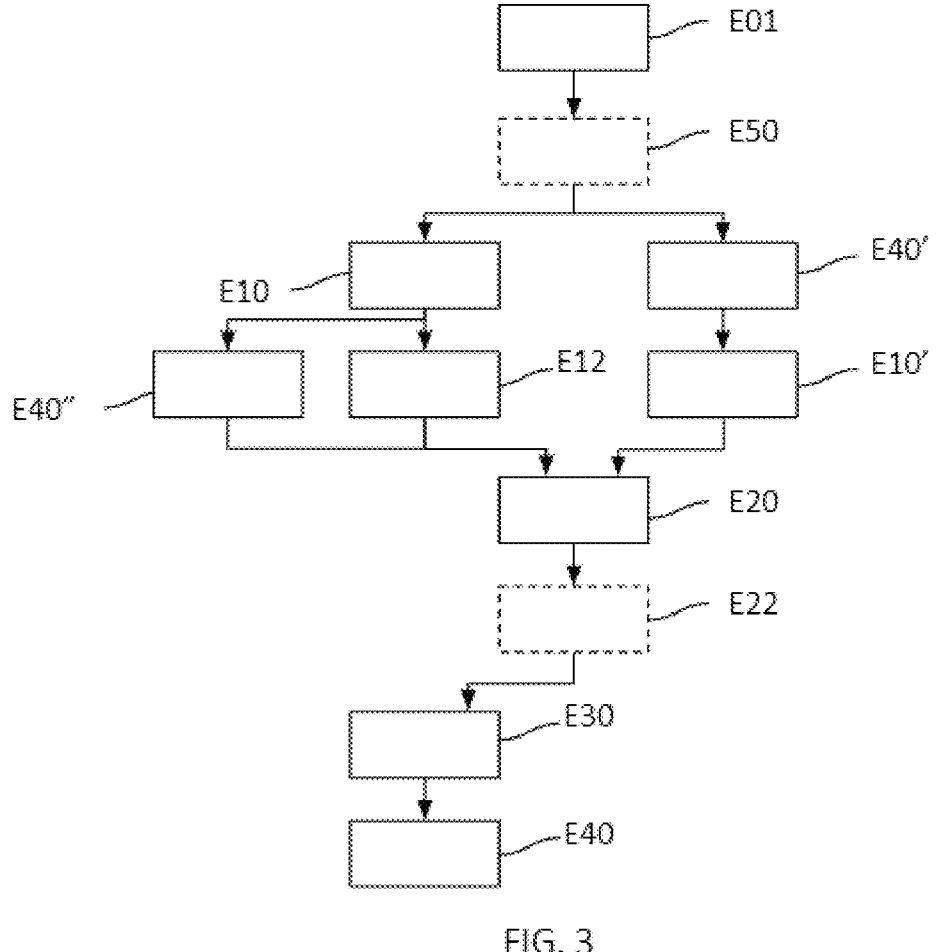
FIG. 3 is a flow chart of the steps of the method for repairing a zone of a structural aircraft part having a protection defect, which illustrates one embodiment of the invention.

FIG. 3 shows a flow chart of the different steps of the method for repairing the damaged zone 30 of the structural aircraft part 12.

Figure 4:
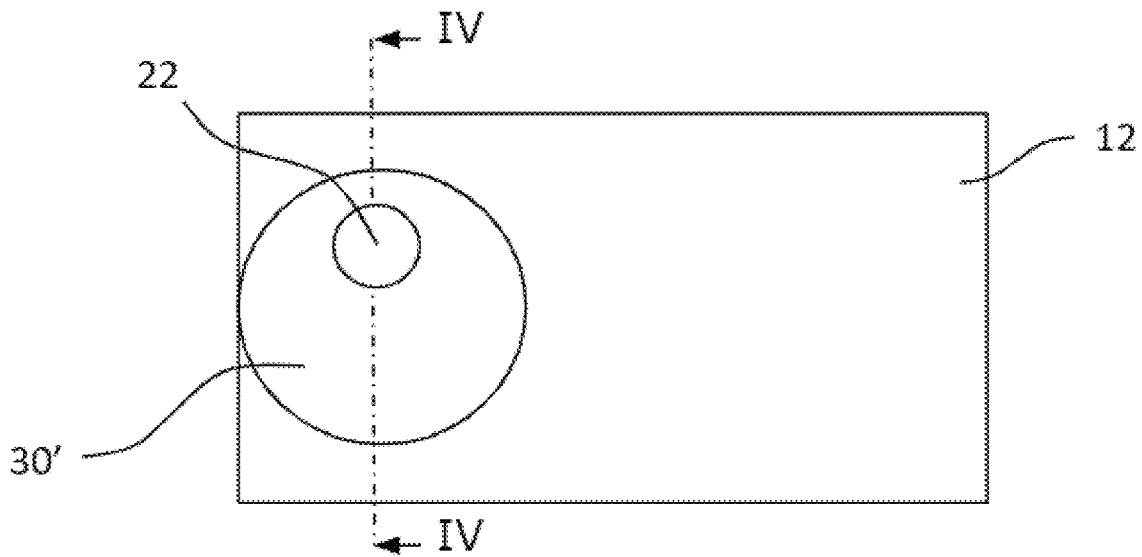
FIG. 4 is a top view of a zone of the structural part of an aircraft, during a step of the repair method according to one embodiment of the invention.
Figure 5:
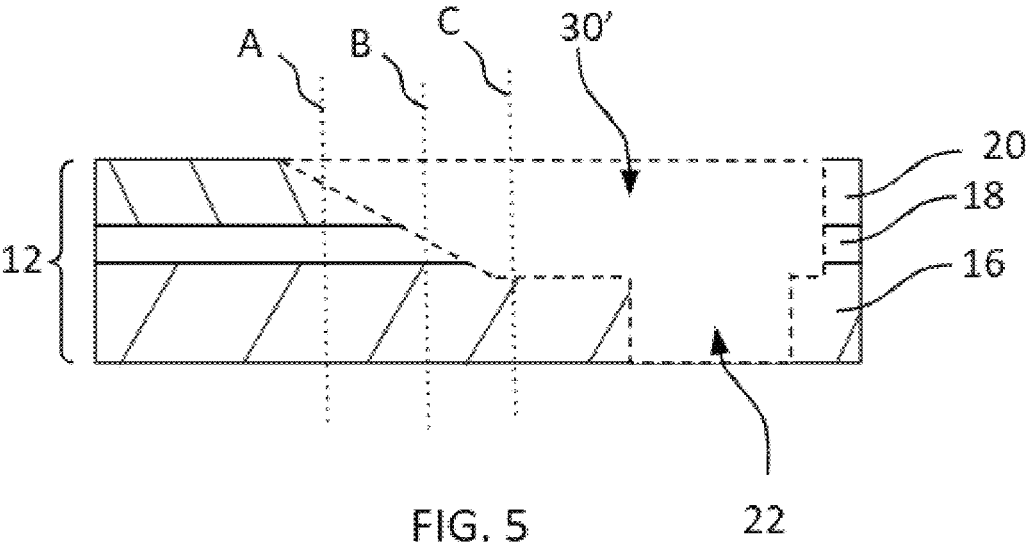
FIG. 5 is a cross-sectional view of FIG. 4, along the line IV-IV.

The method comprises a first step E01 of sanding the damaged zone 30, in order to smooth, that is reduce, the defect 26, and therefore remove part of the paint from the damaged zone 30. In particular, the paint in the damaged zone 30 that is located around the defect 26 is sanded. FIGS. 4 and 5 show the structural aircraft part 12 following this sanding step E01. In the sanded damaged zone 30', part of the coat of paint 20 and part of the coat of aluminium oxide 18 have been removed, so that the body 16 of the metal or aluminium structural aircraft part is stripped, i.e., bare, in this zone 30'. In particular, the coats of paint 20 and aluminium oxide 18 situated between the defect 26 and the orifice 22 for receiving the fastening means have been removed. The defect 26 is thus no longer visible.

On the periphery of the sanded damaged zone 30', a smooth, gradual transition is visible between the body 16 and the surface S of the structural aircraft part 12. This avoids having an abrupt, angular transition between the surface S of the structural aircraft part 12 and the bottom of the damaged zone 30'. For example, as can be seen in FIG. 5, at line A, the bottom of the sanded damaged zone 30' corresponds to the coat of paint 20, while at line B, the bottom of the sanded damaged zone 30' corresponds to the coat of aluminium oxide 18, and at line C, the bottom of the sanded damaged zone 30' corresponds to the body 16 of the structural aircraft part 12.

Figure 6:
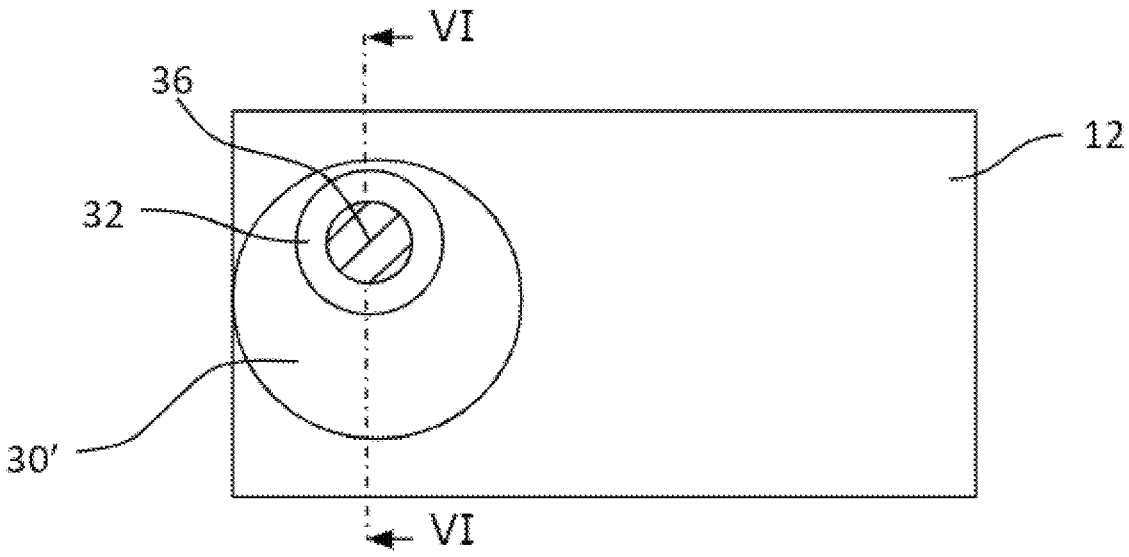
FIG. 6 is a top view of a zone of the structural part of an aircraft, during another step of the repair method according to one embodiment of the invention.
Figure 7:
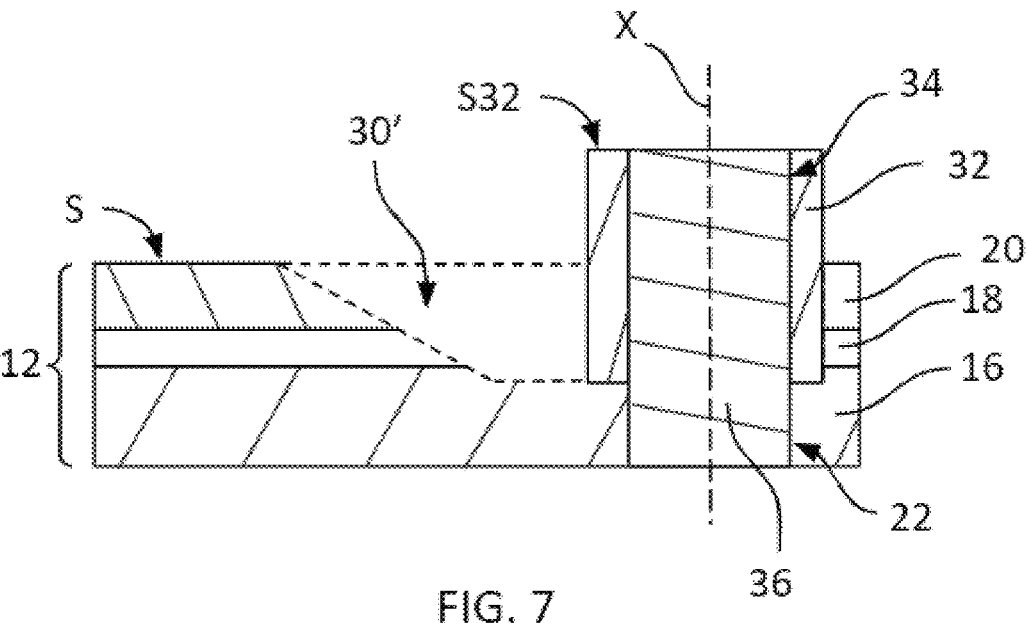
FIG. 7 is a cross-sectional view of FIG. 6, along the line VI-VI.

According to one embodiment, the method then comprises a step E10 of positioning isolation means 32 on the body 16 of the structural aircraft part, in the zone 30', around the orifice 22 for receiving the fastening means. The isolation means 32 can be positioned directly on the bare body 16 of the structural part, or on the coat of aluminium oxide 18, or on a coat of paint 40. FIGS. 6 and 7 show the structural aircraft part 12 following this step E10. The isolation means 32 are substantially cylindrical with an annular base, and extend from the body 16 in a direction orthogonal to the body 16 (along the axis X). The isolation means 32 have an orifice 34 extending along the axis X and having a diameter substantially equal to the diameter of the orifice 22 for receiving the fastening means. The isolation means 32 are positioned in the zone 30' so that the orifice 34 of the isolation means 32 and the orifice 22 for receiving the fastening means are coaxial. The isolation means 32 have a thickness (dimension along the axis X) of between 30 microns and 200 microns. The isolation means 32 thus form a protrusion relative to the surface S of the structural aircraft part 12 outside the damaged zone 30. The isolation means 32 can take the form of a pressure-sensitive adhesive with which a supporting material is coated, for example, with a film made from plastic material. Just one surface of the isolation means is adhesive. The adhesive part of the isolation means 32 is intended to be in contact with the body 16 of the structural aircraft part, in the zone 30', around the orifice 22 for receiving the fastening means, while the non-adhesive part of the isolation means 32 is intended to be facing the head 50 of the fastening means 46. The isolation means 32 can thus be bonded onto the body 16 of the structural aircraft part, in the zone 30', around the orifice 22 for receiving the fastening means. According to one configuration, the isolation means 32 can be made from vinyl, polyurethane or epoxy. According to one configuration, the isolation means 32 comprise a corrosion inhibitor, in order to improve the corrosion-resistant properties of the structural aircraft part 12 at the fastening.

According to this first embodiment, the method then comprises a step E12 of positioning masking means 36 in the orifice 34 of the isolation means 32. The masking means 36 are generally cylindrical with a circular base. The masking means 36 have a shape that complements the shape of the orifice 34 of the isolation means. The diameter of the masking means 36 is substantially equal to the diameter of the orifice 34 of the isolation means 32. The masking means 36 can have a length (dimension along the axis X) sufficient to be inserted into the orifice 22 for receiving the fastening means, as shown in FIG. 7. In other words, the masking means 36 can have a length greater than the thickness of the isolation means 32. The masking means 36 are inserted into the orifice 34 of the isolation means so that they are flush with the upper surface S32 of the isolation means 32. Alternatively, the masking means 36 can be inserted into the orifice 34 of the isolation means 32 so that they protrude from the upper surface S32 thereof. The masking means 36 can take the form of a plug or a peg, which is intended to be removed from the structural aircraft part 12. The masking means 36 are thus removable. The masking means 36 that extend partially outside the orifice 34 of the isolation means 32 are easier to grip than when the masking means 36 are fully inserted into the orifice 34 of the isolation means 32.

According to this first embodiment, the method comprises a step E20 of applying a first coat of primer paint 40 to the sanded zone 30' of the structural aircraft part. This step E20 corresponds to a corrosion-resistant surface treatment. This coat of paint 40 is also applied to the isolation means 32 and to the masking means 36. For example, the thickness of the coat of primer paint 40 is approximately 25 microns. In particular, the isolation means 32 are made from a material to which the primer paint 40 adheres.

Figure 8:
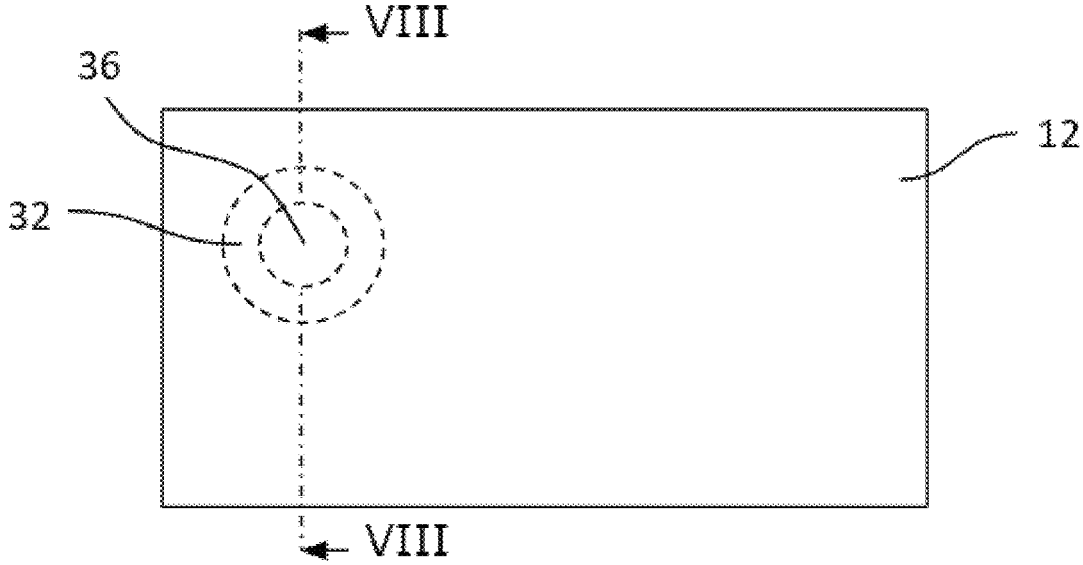
FIG. 8 is a top view of a zone of the structural part of an aircraft, during another step of the repair method according to one embodiment of the invention.
Figure 9:
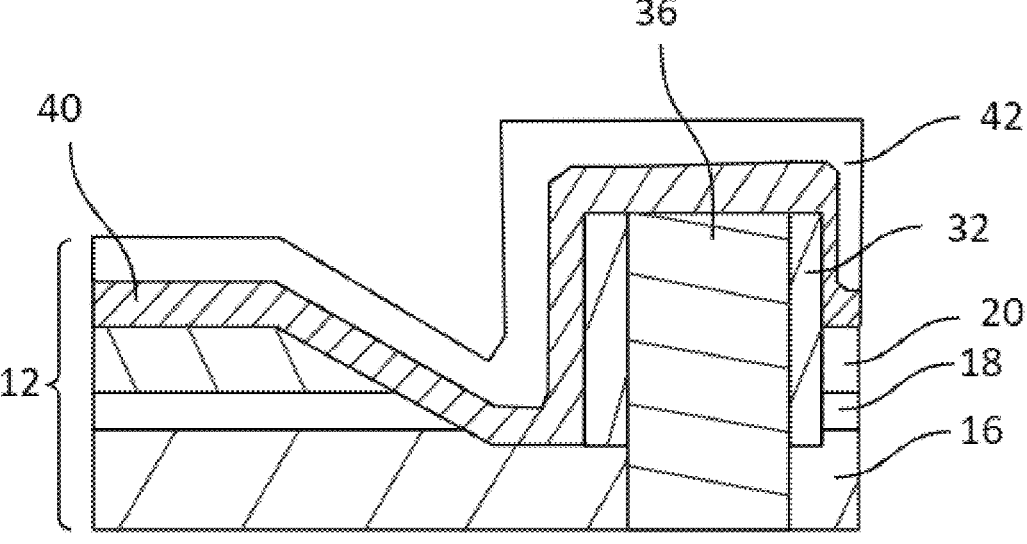
FIG. 9 is a cross-sectional view of FIG. 8, along the line VIII-VIII.

According to this first embodiment, the method then comprises a step E22 of applying a second coat of top coat paint 42 to the first coat of paint 40. For example, the thickness of the coat of top coat paint 42 is approximately 25 microns. This step E22 is optional, and depends on the structural aircraft part 12, and, in particular, its location on the aircraft. FIGS. 8 and 9 show the structural aircraft part 12 following this step E22. As can be seen in FIG. 8, once the coats of paint 40, 42 have been applied, it is no longer possible to determine the exact location of the defect 26, as it has been repaired. In a known manner, the position of the masking means 36 has been marked in advance, so that the masking means can be removed easily. When the masking means 36 are flush with the upper surface S32 of the isolation means 32, the coats of paint 40, 42 are distributed more evenly on the isolation means than when the masking means protrude beyond the orifice 34 of the isolation means 32.

According to this first embodiment, the method then comprises a step E30 of removing the masking means 36 from the orifice 34 of the isolation means 32, and, if applicable, from the orifice 22 for receiving the fastening means. The masking means 36 covered with the coats of paint 40, 42 are removed from the orifices 34, 22 so as to leave free space for the fastening means. As the masking means 36 have a diameter equal to the diameter of the orifice of the isolation means 32, only the coats of paint 40, 42 on the masking means 36 are removed, which leaves the orifice 34 of the isolation means 32 free and the upper surface S32 of the isolation means 32 covered with the coats of paint 40, 42.

Figure 10:
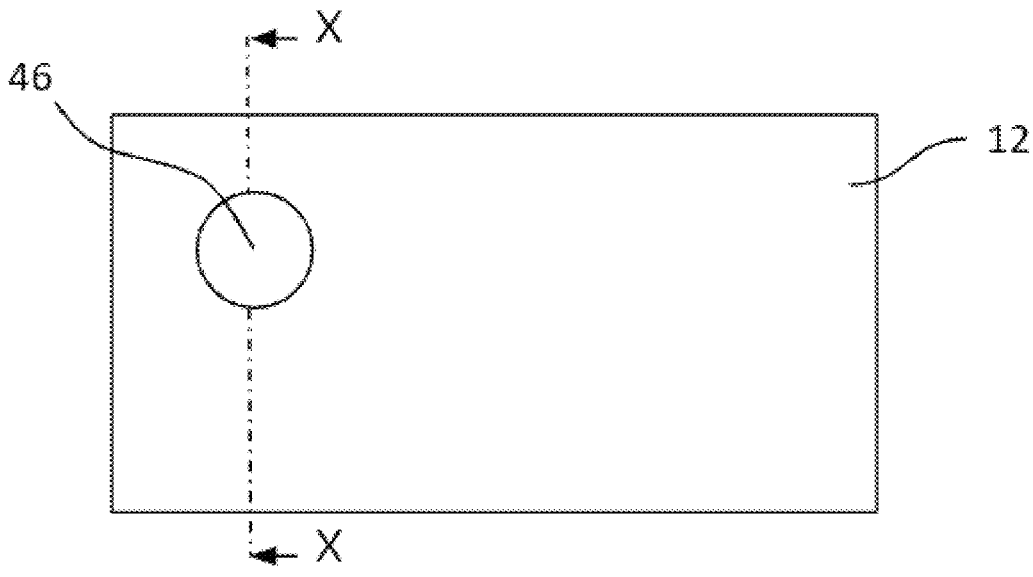
FIG. 10 is a top view of a zone of the structural part of an aircraft, during another step of the repair method according to one embodiment of the invention.
Figure 11:
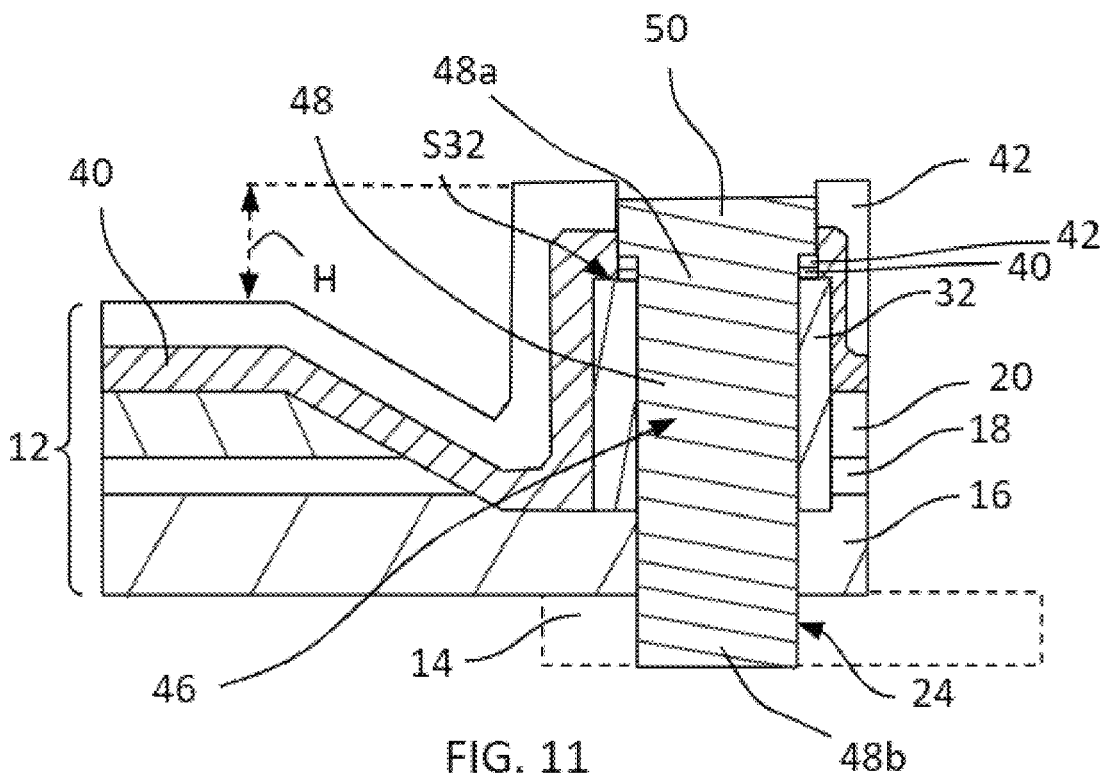
FIG. 11 is a cross-sectional view of FIG. 10, along the line X-X.

According to this first embodiment, the method then comprises a step E40 of inserting the fastening means 46 into the orifice 34 of the isolation means 32, into the orifice 22 for receiving the fastening means, and into the orifice 24 of the structural aircraft part 14. This step E40 can be performed before the drying time of the coat of paint 42 has elapsed. FIGS. 10 and 11 show the structural aircraft parts 12, 14 following this step E40. The fastening means 46 take the form of a shank 48 having a first end 48a and a second end 48b, as well as a head 50 at the first end 48a of the shank 48. The diameter of the head 50 is greater than the diameter of the shank 48. The diameter of the shank 48 is substantially equal to the diameter of the orifice 34 of the isolation means 32. The fastening means 46 are inserted into the orifice 34, then into the orifice 22, and then into the orifice 24 by the second end 48b of the shank 48. The outer diameter of the insulating means 32 is greater than the diameter of the head 50. During the step E40 of inserting the fastening means 46, the head 50 bears against the coat of paint 42. More specifically, on the fastening of the fastening means 46, during the drying of the coat of paint 42, the head 50 comes into contact with the coat of paint 42, which leads to the crazing, or crawling, or movement of the paint out of the zone that faces the head 50 of the fastening means 46 and above the upper surface S32 of the isolation means. Part of the paint 42 (as shown in FIG. 11) can remain present between the head 50 and the isolation means 32, but not necessarily on the entire surface between the fastening means 46 and the isolation means 32. The same applies to the coat of paint 40, only part of which can remain present between the head 50 of the fastening means 46 and the isolation means 32. In any event, the fastening means 46, made from a metal material, are either in contact with a coat of paint 40, 42 or in direct contact with the isolation means 32 (in the event that all of the paint has been expelled from the zone between the head 50 and the upper surface S32 of the isolation means 32, or in the event that crazing has appeared on the entire thickness of the coats of paint 40, 42). As the coats of paint 40, 42 and the isolation means 32 are made from non-metallic materials, the risk of galvanic corrosion between the fastening means 46 and the structural aircraft part 12 is greatly reduced, and the electromagnetic requirements are met.

According to one feature, the fastening means 46 comprise a washer (not shown in the figures) intended to be arranged under the head 50 of the fastening means and to bear against the coat of paint 42 during the step E40 of inserting the fastening means 46. The outer diameter of the isolation means 32 is greater than the diameter of the washer. On the fastening of the fastening means 46, part of the paint 42 can remain present between the washer and the isolation means 32, but not necessarily on the entire surface between the fastening means 46 and the isolation means 32. The same applies to the coat of paint 40, only part of which can remain present between the washer and the isolation means 32. In any event, the fastening means 46, made from a metal material, are either in contact with a coat of paint 40, 42 or in direct contact with the isolation means 32 (in the event that all of the paint has been expelled from the zone between the washer and the upper surface S32 of the isolation means 32, or in the event that crazing has appeared on the entire thickness of the coats of paint 40, 42).

Figure 12:
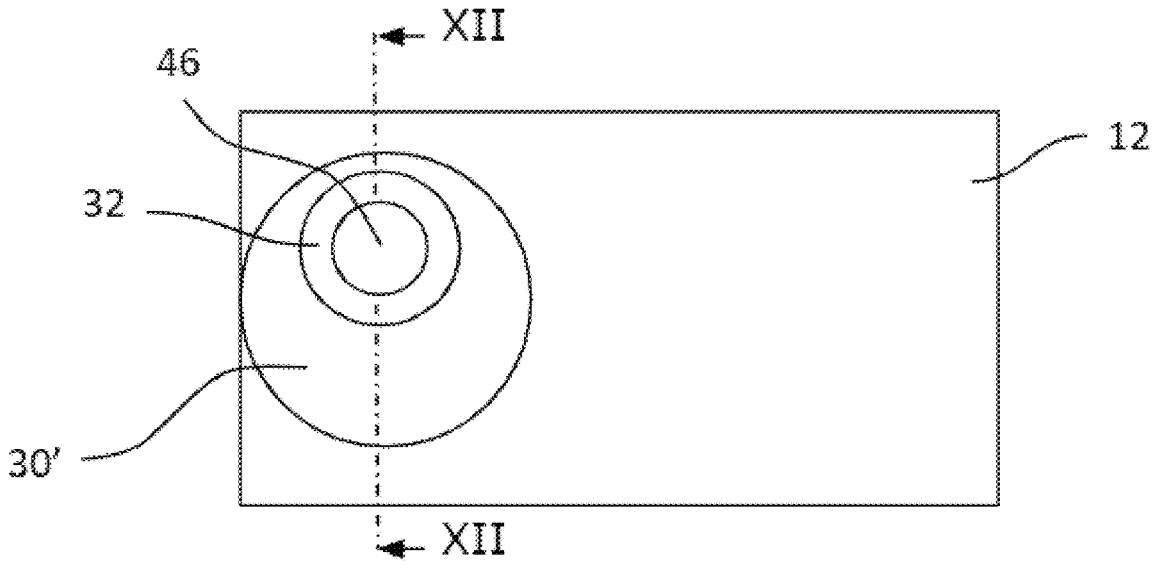
FIG. 12 is a top view of a zone of the structural part of an aircraft, during a step of the repair method according to another embodiment of the invention.
Figure 13:
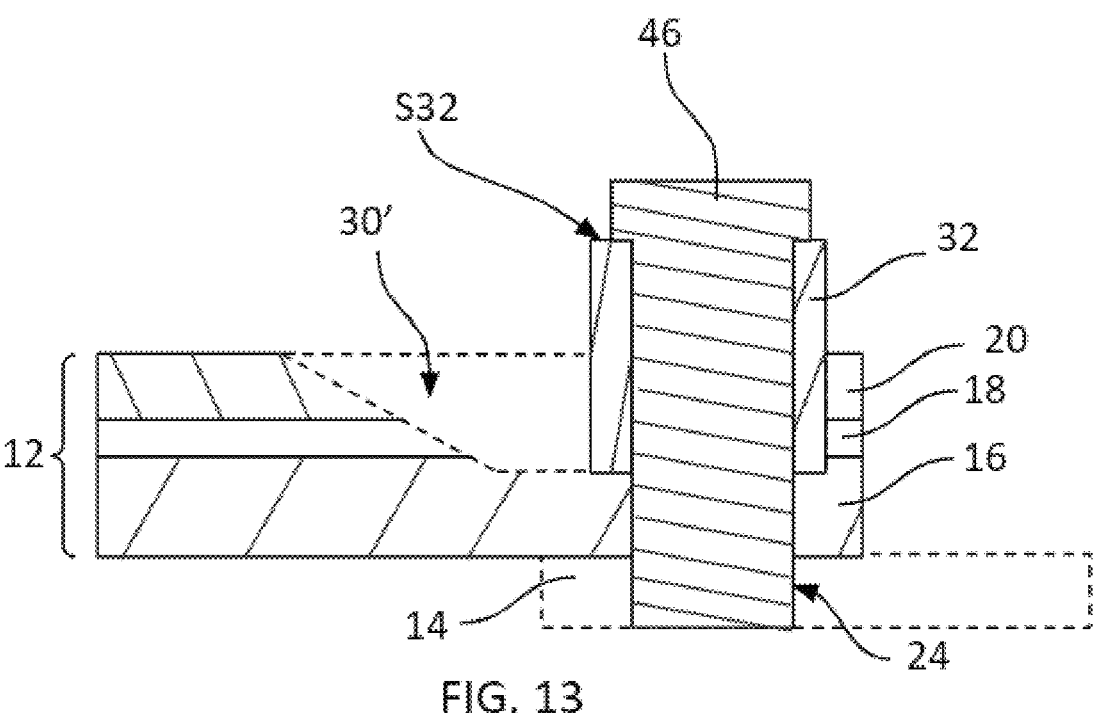
FIG. 13 is a cross-sectional view of FIG. 12, along the line XII-XII.

According to a second embodiment, the method comprises, following the sanding step E01 and prior to the step E20 of applying a first coat of paint, as a variant to steps E10 and E12, a step E40' of inserting fastening means 46 into the orifice 34 of the isolation means 32. The head 50 of the fastening means 46 bears against the upper surface S32 of the isolation means 32. According to this second embodiment, the method then comprises a step E10' of positioning the isolation means 32, in conjunction with the fastening means 46, on the body 16 of the structural aircraft part, in the zone 30', around the orifice 22 for receiving the fastening means. During this step E10', the isolation means 32 are positioned so that the fastening means 46 are inserted into the orifice 22 for receiving the fastening means and into the orifice 24 of the structural aircraft part 14. FIGS. 12 and 13 show the structural aircraft part 12 following this step E10'. The fastening means 46, made from metal, are in direct contact with the isolation means 32. The risk of the occurrence of galvanic corrosion between the fastening means 46 and the structural aircraft part 12 is then very significantly reduced.

Figure 14:
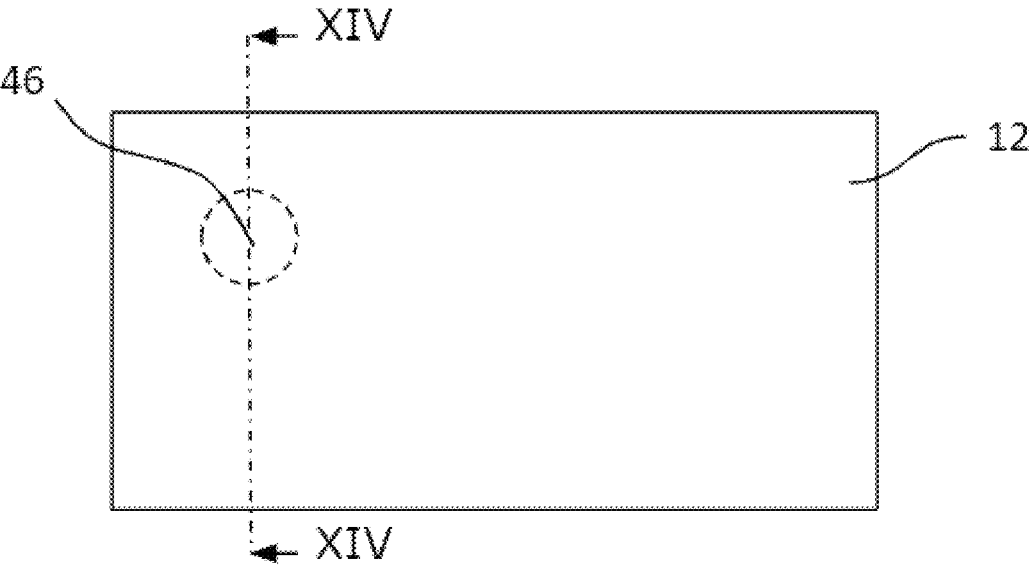
FIG. 14 is a top view of a zone of the structural part of an aircraft, during another step of the repair method according to another embodiment of the invention.
Figure 15:
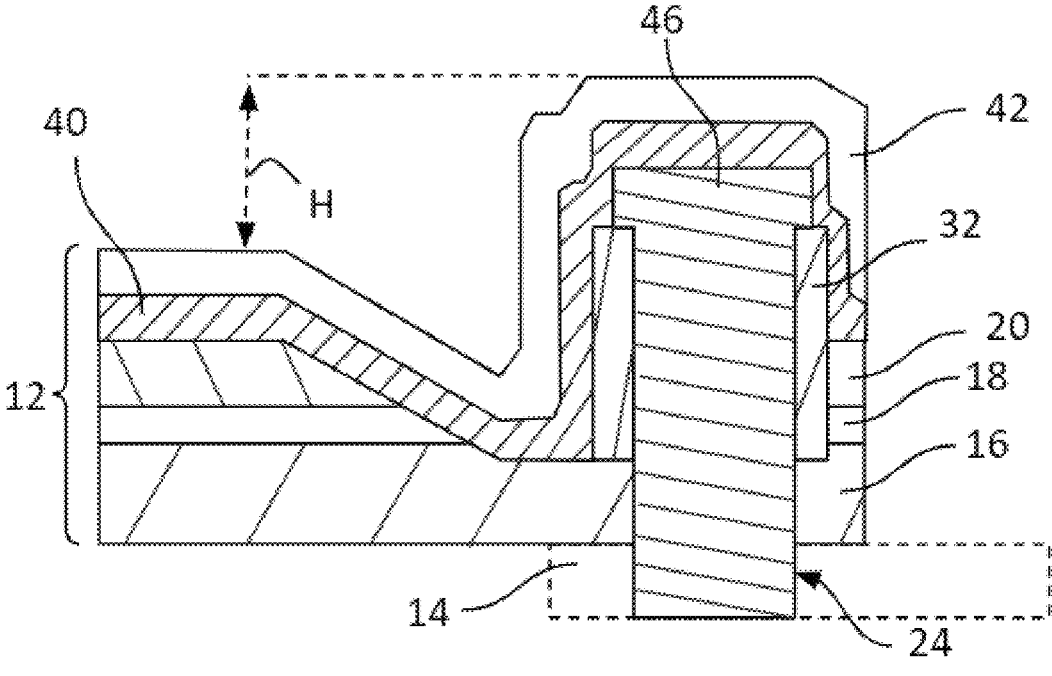
FIG. 15 is a cross-sectional view of FIG. 14, along the line XIV-XIV.

According to this second embodiment, the coat of paint 40 is applied to the isolation means 32 and to the fastening means 46. The fastening means are positioned before the coats of paint are applied. In particular, the isolation means 32 and the fastening means 46 are made from a material to which the primer paint 40 adheres. FIGS. 14 and 15 show the structural aircraft part 12 following step E22 according to this second embodiment. As can be seen in FIG. 14, once the coats of paint 40, 42 have been applied, it is no longer possible to determine the exact location of the defect 26, as it has been repaired.

Advantageously, in this second embodiment, the fastening means are painted, and therefore not visible after the application of the coats of paint 40, 42 compared with the first embodiment described.

As a variant to this second embodiment, the method comprises, following the step E10 of positioning the isolation means and prior to the step E20 of applying a first coat of paint 40, as a variant to steps E10' and E12, a step E40" of inserting fastening means 46 into the orifice 34 of the isolation means 32 and into the orifice 22 for receiving the fastening means 46. The isolation means 32 are therefore arranged on the structural part prior to the insertion of the fastening means 46, and not simultaneously with the fastening means 46, as in the second embodiment.

As shown in FIGS. 11 and 15, after the different steps of the repair method, there is a height difference (denoted H, along the axis X) between the upper surface S42 of the second coat of paint 42 on the structural aircraft part 12 outside the zone 30 that was damaged and on the fastening means 46 or in the vicinity of the fastening means 46. The upper surface S42 is not linear. This height difference H is not visible to the naked eye, or is minimal. As a result, the repair of the paint defect 26 is not externally visible after repair (only the presence of the isolation means 32 indicates the presence of a protection defect that has undergone the repair method according to the invention).

Figure 16:
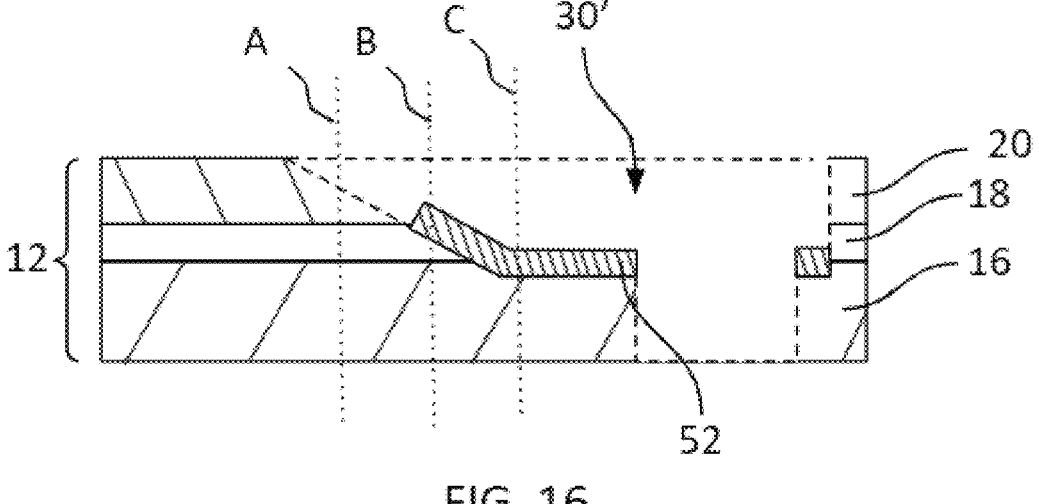
FIG. 16 is a cross-sectional view of a zone of the structural part of an aircraft, during a step of the repair method according to one embodiment of the invention.

According to another embodiment, following the sanding step E01, and prior to the step E20 of applying a first coat of paint, the method comprises a step E50 of surface treatment of the sanded zone 30' of the structural aircraft part, during which a surface treatment 52, for example a chemical conversion coating or a reactive primer, is applied to part of the sanded zone 30' of the structural aircraft part. This surface treatment 52 allows improved adhesion of the coat of primer paint. The surface treatment can be applied in a bath, or locally. FIG. 16 shows the structural aircraft part 12 following this step E50. In particular, the surface treatment 52 is not applied on a pre-existing coat of primer paint 20, but only on a pre-existing coat of aluminium oxide 18 or on the bare body 16 of the structural aircraft part 12. Preferably, the surface treatment, local or bath, is applied only to the bare body 16 of the structural aircraft part 12. It is preferable to avoid superposing surface treatments. According to one embodiment, during the sanding step E01, as the coat of aluminium oxide 18 is thin (approximately between 1 micron and 5 microns), it is entirely removed, which makes it possible to apply the surface treatment 52 only to the bare body 16 of the structural aircraft part 12. For example, as shown in FIG. 16, the surface treatment 52 is applied at lines B and C, but not at line A. This surface treatment 52 is not necessary on the coat of primer paint 20. This surface treatment 52 has a drying time of between 30 minutes and 1 hour. For example, the thickness of this surface treatment 52 is less than or equal to 1 micron. The coat of aluminium oxide 18 can have a thickness of approximately 5 microns after a bath surface treatment, and a thickness of approximately 1 micron after a local surface treatment such as chemical conversion.

Regardless of the embodiment, the presence of the isolation means 32 between the fastening means 46 and the structural aircraft part 12 of the aircraft makes it possible to establish an isolating barrier between the metal material forming the fastening means 46 and the metal material forming the structural aircraft part, which makes it possible to reduce the risk of the occurrence of galvanic corrosion on the repair of a defect in the vicinity of the fastening, and to ensure that the electromagnetic requirements are met along the entire length of the structural part of the aircraft.

In addition, it makes it possible to make the repair of the protection defect independent of the drying time of the paint applied to the structural part of the aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for repairing a zone of a metal structural part of an aircraft having a protection defect, said zone of the structural part having a first orifice for receiving metal fastening means, said first orifice having a first diameter, said method for repairing comprising the steps of:

sanding, during which paint in said zone of the structural aircraft part is sanded, positioning isolation means, during which isolation means are positioned on said sanded zone of the structural aircraft part around said first orifice, said isolation means comprising a second orifice having a second diameter substantially equal to the first diameter of the first orifice, said isolation means being positioned on said sanded zone of the structural aircraft part around the first orifice so that said first and second orifices are coaxial, and applying at least one coat of paint, during which a coat of primer paint is applied to the sanded zone of the structural aircraft part, said coat of primer paint being applied to said isolation means.

2. The repairing method according to claim 1, comprising, prior to the step of positioning the isolation means, there is a step of inserting fastening means, during which fastening means are inserted into the second orifice of the isolation means, and wherein during the step of positioning the isolation means, the fastening means are inserted into the first orifice, and during the step of applying the coat of primer paint, said coat of primer paint is applied to said fastening means.

3. The repairing method according to claim 2, wherein the fastening means are formed as a shank having first and second ends, and a head at said first end, said fastening means being inserted into the first and second orifices by the second end of the shank, wherein an outer diameter of the isolation means is greater than a diameter of the head of the fastening means, and wherein during the step of inserting fastening means, the head of said fastening means bears against said isolation means.

4. The repairing method according to claim 1, comprising, prior to the step of applying the coat of primer paint, there is a step of inserting fastening means, during which fastening means are inserted into the second orifice of the isolation means and into the first orifice, and during the step of applying the coat of primer paint, said coat of primer paint is applied to said fastening means.

5. The repairing method according to claim 1, comprising, prior to the step of applying the coat of primer paint, there is a step of positioning masking means, during which masking means are positioned in the first and second orifices, and after the step of applying the coat of primer paint, there is a step of removing the masking means during which the masking means are removed from the first and second orifices, and there is a step of inserting fastening means, during which the fastening means are inserted into the first and second orifices.

6. The repairing method according to claim 5, wherein the fastening means are formed as a shank having first and second ends, and a head at said first end, said fastening means being inserted into the first and second orifices by the second end of the shank, wherein the outer diameter of the isolation means is greater than the diameter of the head of the fastening means, and wherein during the step of inserting fastening means, the head of said fastening means bears against the coat of primer paint.

7. The repairing method according to claim 1, comprising, after the sanding step, there is a surface treatment step during which a chemical conversion coating or a reactive primer is applied to at least part of said sanded zone of the structural aircraft part.

8. The repairing method according to claim 1, wherein the isolation means are formed as a pressure-sensitive adhesive with which a supporting material is coated.

9. The repairing method according to claim 1, wherein the isolation means are made from vinyl, polyurethane or epoxy.

10. The repairing method according to claim 1, wherein the isolation means comprise a corrosion inhibitor.

11. The repairing method according to claim 1, wherein the isolation means have a thickness of between 30 and 200 microns.

* * * * *